US009973583B2

(12) United States Patent
Quiriconi et al.

(10) Patent No.: US 9,973,583 B2
(45) Date of Patent: May 15, 2018

(54) METHOD FOR ACCESSING A SERVICE, CORRESPONDING DEVICE AND SYSTEM

(71) Applicant: GEMALTO SA, Meudon (FR)

(72) Inventors: Jean-Rémi Quiriconi, La Ciotat (FR); Nicolas Roussel, La Ciotat (FR)

(73) Assignee: GEMALTO SA, Meudon (FR)

( * ) Notice: Subject to any disclaimer, the term of this patent is extended or adjusted under 35 U.S.C. 154(b) by 270 days.

(21) Appl. No.: 14/890,082

(22) PCT Filed: May 7, 2014

(86) PCT No.: PCT/EP2014/059362
§ 371 (c)(1),
(2) Date: Nov. 9, 2015

(87) PCT Pub. No.: WO2014/180914
PCT Pub. Date: Nov. 13, 2014

(65) Prior Publication Data
US 2016/0088096 A1     Mar. 24, 2016

(30) Foreign Application Priority Data
May 7, 2013   (EP) .................................. 13305594

(51) Int. Cl.
*H04L 29/08*        (2006.01)
*H04W 4/50*         (2018.01)
(Continued)

(52) U.S. Cl.
CPC .......... *H04L 67/16* (2013.01); *H04L 63/0853* (2013.01); *H04L 67/10* (2013.01);
(Continued)

(58) Field of Classification Search
CPC ...... H04L 67/16; H04L 67/34; H04L 63/0853; H04L 67/10; H04W 4/50; H04W 12/04; H04W 8/18; H04W 12/02
See application file for complete search history.

(56) References Cited

U.S. PATENT DOCUMENTS 6,353,737 B1 *   3/2002   Herzog .................. H04W 8/183
                                                    455/418
8,321,481 B2 *  11/2012   Guthery ................ G06F 12/023
                                                    707/692
(Continued)

FOREIGN PATENT DOCUMENTS

EP              2 530 631 A1      12/2012
WO     WO 2006100669 A2 *   9/2006  ............ G06K 19/07
WO     WO 2012/076425 A1    6/2012

OTHER PUBLICATIONS

International Search Report (PCT/ISA/210) dated Jul. 18, 2014, by the European Patent Office as the International Searching Authority for International Application No. PCT/EP2014/059362.
Written Opinion (PCT/ISA/237) dated Jul. 18, 2014, by the European Patent Office as the International Searching Authority for International Application No. PCT/EP2014/059362.

*Primary Examiner* — Patrice L Winder
(74) *Attorney, Agent, or Firm* — Buchanan Ingersoll & Rooney PC (57) ABSTRACT

A device comprises a memory. The memory stores data relating to at least one service profile template. The service profile template includes executable data. A server sends to the device a first message including a request for creating or modifying at least one service profile based upon a service profile template. The device executes the executable data. The device creates or modifies a memory area. The memory area is associated with a service profile by using the service profile template. The device sends to the server at least one second message including a request for loading into the device data relating to at least one service profile. The server (Continued)

sends to the device at least one third message including data relating to at least one service profile. And the device stores within the created or modified memory area the data relating to at least one service profile.

10 Claims, 1 Drawing Sheet

(51) Int. Cl.
*H04W 12/04* (2009.01)
*H04L 29/06* (2006.01)
*H04W 8/18* (2009.01)
*H04W 12/02* (2009.01)

(52) U.S. Cl.
CPC ............ *H04L 67/34* (2013.01); *H04W 4/50* (2018.02); *H04W 12/04* (2013.01); *H04W 8/18* (2013.01); *H04W 12/02* (2013.01)

(56) References Cited

U.S. PATENT DOCUMENTS

| | | | |
|---|---|---|---|
| 2005/0108534 A1* | 5/2005 | Bajikar | G06F 21/606 713/172 |
| 2007/0218945 A1* | 9/2007 | Agami | H04W 8/183 455/558 |
| 2009/0117875 A1* | 5/2009 | Weigele | H04M 1/72525 455/411 |
| 2010/0099405 A1* | 4/2010 | Brisebois | H04L 41/0893 455/434 |
| 2011/0195700 A1* | 8/2011 | Kukuchka | H04W 8/18 455/422.1 |
| 2012/0190354 A1* | 7/2012 | Merrien | H04W 4/001 455/422.1 |
| 2014/0057680 A1 | 2/2014 | Proust et al. | |

* cited by examiner

METHOD FOR ACCESSING A SERVICE, CORRESPONDING DEVICE AND SYSTEM

FIELD OF THE INVENTION

The invention relates generally to a method for accessing a service.

Moreover, the invention pertains to a device for accessing a service.

Finally, the invention also relates to a system for accessing a service as well.

The present invention is notably applicable to a mobile radio-communication field. In such a mobile radio-communication field, a token, like an embedded chip, such as an embedded Universal Integrated Circuit Card (or eUICC), or a Subscribed Identity Module (or SIM) type card, that is coupled or connected to a mobile (tele)phone, cooperates with a remote server.

STATE OF THE ART

WO2012/076425 A1 describes a solution in which a UICC lets open an Internet Protocol (or IP) channel between a host terminal and a remote server, so as to download, over the open IP channel, a complete subscription profile.

However, such a known solution needs to use an IP channel to download from the remote server a complete subscription profile.

There is a need to optimize data to be downloaded for a new subscription profile, so as to reduce data traffic over a mobile radio-communication network.

SUMMARY OF THE INVENTION

The invention proposes a solution for satisfying the just herein above specified need by supplying a method for accessing a service.

According to the invention, a device comprises a memory. The memory stores data relating to at least one service profile template. The service profile template includes executable data. The method comprises the following steps. A server sends to the device a first message including a request for creating or modifying at least one service profile based upon a service profile template. The device executes the executable data. The device creates or modifies a memory area. The memory area is associated with a service profile by using the service profile template. The device sends to the server at least one second message including a request for loading into the device data relating to at least one service profile. The server sends to the device at least one third message including data relating to at least one service profile. And the device stores within the created or modified memory area the data relating to at least one service profile.

The principle of the invention consists in a device that generates, under a control of a server, dynamically a service profile by using an on-board service profile template with executable data and that complements the service profile with data provisioned from the server.

Such a data complement allows transmitting to the device only few data, like data relating to a diversified part of the service profile.

The invention solution requires neither any user intervention nor a person who works on behalf of a service provider, so as to access a complete service profile allowing to access (an)other service(s).

The invention solution is thus convenient for the device user.

Contrary to the herein above described known solution, the invention device does not need to download data relating to a complete service subscription profile but only some data, like e.g. credentials, relating to a diversified part of the service subscription profile.

Contrary to the herein above described known solution, the device does not need to use any IP channel since only few data is to be downloaded from the remote server, so as to complete an on-board generated service profile. Thus, data traffic between the remote server and the device is greatly reduced with respect to the known solution.

According to a further aspect, the invention is a device for accessing a service.

According to the invention, a device comprises a memory. The memory stores data relating to at least one service profile template. The service profile template includes executable data. The device is adapted to:
- receive from a server a first message including a request for creating or modifying at least one service profile based upon a service profile template;
- execute the executable data;
- create or modify a memory area, the memory area being associated with a service profile by using the service profile template;
- send to the server at least one second message including a request for loading into the device data relating to at least one service profile;
- receive from the server at least one third message including data relating to at least one service profile; and
- store within the created or modified memory area the data relating to at least one service profile.

The device may be a terminal or a token.

The invention does not impose any constraint as to a kind of the token. The token may be fixed to or removable from a host device. The token may be a Machine-to-Machine (or M2M) module.

As removable token, it may be a smart card, like a SIM type card, a Secure Removable Module (or SRM), a smart dongle of the USB (acronym for "Universal Serial Bus") type, a (micro) Secure Digital (or SD) type card or a Multi-Media type Card (or MMC), or any format card to be coupled to a host device.

According to still an additional aspect, the invention is a system for accessing a service.

According to the invention, the system comprises a server and a device. The device is connected or coupled to the server. The device comprises a memory. The memory stores data relating to at least one service profile template. The service profile template includes executable data. The server is adapted to send to the device a first message including a request for creating or modifying at least one service profile based upon a service profile template. The device is adapted to:
- execute the executable data;
- create or modify a memory area, the memory area being associated with a service profile by using the service profile template;
- send to the server at least one second message including a request for loading into the device data relating to at least one service profile.

The server is adapted to send to the device at least one third message including data relating to at least one service profile. And the device is adapted to store within the created or modified memory area the data relating to at least one service profile.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for accessing a service is implemented by an embedded chip, as token, that is soldered to a mother board of a mobile phone, as (token) host device, and a remote server.

Within the present description, a token is a smart object that is intended to communicate with the outside world. The token may be constituted by any electronic medium.

According to another embodiment (not represented), the invention method for accessing a service is implemented by a device, as standalone entity, and a remote server. In other words, the device, like a user terminal, does not cooperate with any token, so as to allow a remote server to launch a service profile on-board generation and to issue complementary data relating to the generated service profile. According to such an embodiment (not represented), the device is adapted to carry out the functions that are described infra and that are carried out by the token and the device.

Naturally, the herein below described embodiment is only for exemplifying purposes and is not considered to reduce the scope of the invention.

Figure 1:
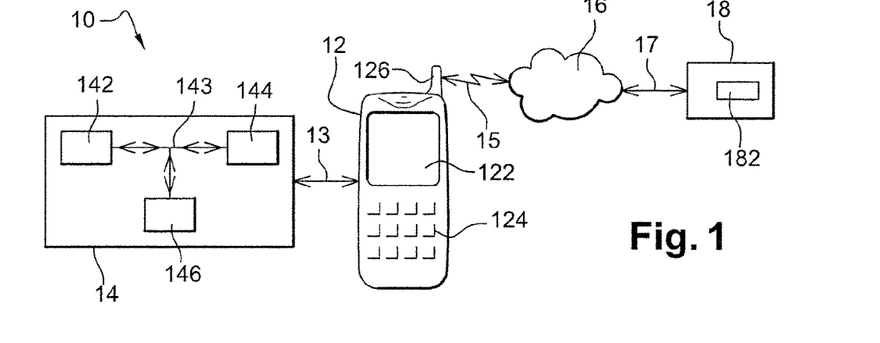
FIG. 1 illustrates a simplified diagram of one embodiment of a system for accessing a service including a token, a host terminal and a remote server, so as to provision the token with a service profile while on-board generating a service profile based upon a service profile template, according to the invention.

FIG. 1 shows schematically a system 10 for accessing a service.

Such a system includes an embedded UICC 14, as token and device for accessing a service, a mobile phone 12, as host device, and a remote server 18.

For sake of simplicity, the mobile phone 12, the embedded UICC 14 and the remote server 18 are termed herein after the phone 12, the token 14 and the server 18 respectively.

It is to be noted that only one token 14 is represented for clarity reason. However, the server 18 is able to control a fleet of tokens. The server 18 allows each token to trigger an auto-installation of one or several profiles of one or several services, as service profile(s), based upon one or several service profile templates resident at the token side.

Instead of a phone, it may be any other device including means for processing data, comprising or being connected to wireless communication means for exchanging data with outside and comprising or being connected to means for storing data.

Within the present description, the adjective "wireless" used within the expression "wireless communication means" denotes notably that the communication means communicates via one or several long range Radio-Frequency (or RF) links.

The long range RF may be fixed at several hundreds of MHz, for instance, around 850, 900, 1800, 1900 and/or 2100 MHz.

Instead of being constituted by a phone, the host device may be, for instance, a set-up box, a desktop computer, a laptop computer, a media-player, a Global Positioning System (or GPS) system, a game console, a tablet, a netbook, a handset and/or a Personal Digital Assistance (or PDA).

Such a host device list is not exhaustive but only for exemplifying purposes.

The phone 12 is preferably used for accessing one or several mobile radio-communication networks 16.

The mobile radio-communication network(s) 16 may be constituted by a Global Service for Mobiles (or GSM), a General Packet Radio Service (or GPRS), a Universal Mobile Telecommunications System (or UMTS), a UTRAN (acronym for "UMTS Terrestrial Radio Access Network"), an Enhanced Data Rates for GSM Evolution (or EDGE), a Code Division Multiple Access (or CDMA), a Wide Local Area Network (or WLAN) and/or a Long Term Evolution (or LTE) type network(s).

Such a mobile radio-communication network list is not exhaustive but only for exemplifying purposes.

Instead of a mobile radio-communication network(s), it may be constituted by an Internet type network. The Internet type network is accessible, via a wire, wireless or contact-less link. As to contact-less link, it is an RF link, like a Wifi or Bluetooth (registered trademark) type, through an intermediate entity, as an Internet access point, that allows accessing Internet type network.

The phone 12 includes preferably a display screen 122 and a keyboard 124, as Man Machine Interface (or MMI).

Alternatively, instead of a display screen, the phone 12 is equipped with a touch sensitive display screen.

The MMI allows a phone user to interact with the phone 12.

The phone 12 comprises an antenna 126. The antenna 126 allows communicating data, through a long range RF link(s) 15, over one or several mobile radio-communication networks 16, with a server 18.

The phone 12 includes data processing means, such as one microprocessor (not represented), data storing means (not represented), as phone memory, and at least one Input/Output (or I/O) interface that are linked all together through a control and data bus (not represented).

The phone 12, as intermediary device between the token 14 and the server 18, plays, in a preferential manner, a role of a modulator-demodulator (or modem), so as to exchange data notably between the token 14 and the server 18.

The phone memory may comprise one or several memories, such as a flash memory(ies) and/or a hard disk drive(s).

The phone memory stores preferably an identifier relating to the phone 12, like an International Mobile Equipment Identity (or IMEI).

The phone memory stores an Operating System (or OS) and one or several applications.

The phone 12 is preferably coupled or connected to the token 14.

The token 14 is under control of the phone microprocessor.

Alternately, instead of being coupled to the token 14, the phone 12 stores, within its memory, data stored within the token 14 as described infra.

The phone I/O interface includes an I/O interface for exchanging data with the token 14.

According to a preferred embodiment, a token chip is soldered to a Printed Circuit Board (or PCB) of the phone 12.

Alternatively, the phone I/O interface with the token 14 may be an International Organization for Standardization (or ISO) 7816 interface, as contact interface when the token 14 is inserted within the phone 12.

Instead of a contact interface, the phone I/O interface with the token 14 includes or is connected to a contact-less interface. The phone 12 includes or is connected to means for communicating data while using preferably a short range RF link. The short range RF link may be related to any technology type that allows the phone 12 to exchange data with an external proximate device, as local device (not represented) (instead of the server 18 as remote device). The short range RF may be fixed at 13.56 MHz and related to a Near Field Communication (or NFC) type technology, as contact-less technology.

The token 14 is preferably associated with or tied to the server 18, as service provider.

The token 14 is deployed in the field, i.e. has been issued.

The token 14 needs to be further personalized, i.e. loaded with one or several service profiles.

The token 14 belongs to a user, as preferably subscriber to a wireless service, so as to be able to access the server 18, in order to install at least on-board a new service profile.

The token 14 is connected, through a bi-directional contact link 13, to the phone 12.

According to another embodiment (not represented), the token 14 is connected, through a bi-directional contact-less link, i.e. a short range RF link, to the phone 12.

The token 14 includes a chip (not represented).

The token chip includes at least one microprocessor 142, as data processing means, at least one memory 144, as data storing means, and at least one I/O interface 146 that are internally all connected, through an internal bidirectional data bus 143, to each other.

The token chip includes typically a working memory and a non-volatile memory. The working memory comprises preferably a Random Access Memory (or RAM). The non-volatile memory may comprise a NAND type memory, a Flash type memory and/or an Electrically Erasable Programmable Read-Only Memory (or EEPROM). For simplicity reason, only one memory 144 is represented.

The token I/O interfaces 146 allow communicating data from the internal chip components to the chip exterior and conversely.

The token microprocessor 142 processes, controls and communicates internally data with all the other components incorporated within the chip and, through the I/O interfaces 146, with the chip exterior.

The token microprocessor 142 executes or runs one or several applications.

The token memory 144 stores preferably one or several Subscriber Identity Module (or SIM) type applications and possibly (an)other application(s).

The SIM type application(s) includes, among others, a SIM application for a Global Service for Mobiles (or GSM) type network, a Universal Subscriber Identity Module (or USIM) application for a Universal Mobile Telecommunications System (or UMTS) type network, a Code Division Multiple Access (or CDMA) Subscriber Identity Module (or CSIM) application and/or an Internet protocol Multimedia Subsystem (or IMS) Subscriber Identity Module (or ISIM) application.

The SIM type application(s) allow(s) the phone 12 to authenticate to the mobile radio-communication network(s) 16.

The token microprocessor 142 executes, in a preferred manner, one or several security functions.

The security functions include preferably a user authentication process to be used prior to accessing the token memory 144. To authenticate the user, the user has to provide a Personal Identity Number (or PIN), at least one user credential and/or biometric data, as user reference data, that is securely stored within the token memory 144. As biometric data, it may include one fingerprint(s), one iris print(s) and/or one voiceprint(s) relating to one authorized user(s).

The security functions include preferentially an encryption/decryption process to be used before sending data to outside/after receiving data from outside, so as to protect access to data managed by or through the token 14. To encrypt data to be sent, the token 14 uses an encryption key and an encryption algorithm, such as an Advanced Encryption Standard (or AES), a Data Encryption Standard (or DES) or the like, that are stored within the token memory 144. To decrypt data to be received, the token 14 may use a decryption key and a decryption algorithm, such as an AES, a DES or the like, that are stored within the token memory 144.

The security functions include preferentially a data signature process to be used prior to sending data, so as to prove an origin of data originating from the token 14. To sign data, the token 14 uses preferably a predetermined signature algorithm and a predetermined signature key Ks1 that are both stored within the token memory 144. The signature key Ks1, as private key, is related to the token 14. An interlocutor, like e.g. the server 18, verifies corresponding signed data by using a predetermined signature verification algorithm and a predetermined signature verification key that are both stored within the interlocutor memory. The signature verification key is preferably a public key relating to the token 14 that has been generated based upon the token private key. According to one embodiment, the signature key and the signature verification key constitute one and the same key, as a key shared between the token 14 and its interlocutor(s), namely the server 18 and/or another device(s).

The token microprocessor 142 is preferably able to initiate actions, in order to interact directly with the outside world, in an independent manner of the phone 12, as host device. Such a capacity of interaction at an initiative of the token 14 is also known as proactive capacity. The token 14 is thus able to send, at its own initiative, through the phone 12, to any device connected to the phone 12 a proactive command for sending, for instance, a request for loading data relating to one service profile while indicating preferably a service profile identifier or a service profile template identifier.

The token memory 144 stores preferably data relating to a token identifier, like an Integrated Circuit Card Identifier (or ICCID).

The token memory 144 stores preferably data relating to a Uniform Resource Identifier (or URI), a Uniform Resource Locator (or URL) and/or an Internet Protocol (or IP) address of a remote server 18, as identifier of the server to be addressed or from which data is allowed to be received.

According to an essential invention feature, the token memory 144 stores data relating to one or several service profile templates.

For simplicity reason, only one service profile template is predetermined and stored. However, the token memory 144 may store a plurality of service profile templates, so as to create a corresponding plurality of service profiles with, for instance, different data structures.

The service profile template may be stored within the token memory 144, during a customization or personalization of the token 14, preferably before its issuance. The service profile template is preloaded preferably during a manufacturing of the token. The service profile template may be compressed, so as to reduce a memory size dedicated to storing the service profile template data.

The service profile template includes a plurality of setting parameters or items.

The service profile template may be compliant with standard 3GPP specifications.

The service profile template may use generic content data, so as to be re-usable.

The service profile template may be predefined by a mobile radio-communication network operator.

The service profile template includes, as executable data, a code relating to an application for creating or modifying a service profile.

The executable data is compiled in an intermediate code, e.g. in a byte code.

According to an essential invention feature, the token 14 is adapted or configured to execute the executable data that is included within the service profile template.

The executable data is intended to be executed by a token OS.

The token memory 144 stores an OS.

The token OS includes a Virtual Machine (or VM). The token VM manages notably an administration of the token memory 144 and an interpretation of executable data. The administration of the token memory 144 includes an instantiation of the executable data of the service profile template that requests preferably a loading of data relating to the diversified part of the service profile.

In a preferred embodiment, the VM is an Object-Oriented VM, i.e. the application is written in an Object-Oriented language, like an applet compliant with standard JavaCard specifications.

The executable data of the service profile template corresponds to an application for creating or modifying at least one service profile based upon the service profile template.

A triggering of an execution of the service profile modification or creation application (i.e. the service profile template executable data) occurs preferably after having received a message that includes a script, as a command for triggering an execution of the service profile template executable data.

Alternatively, a triggering of an execution of the service profile modification or creation application occurs when a predetermined event(s) is received from the phone 12. As predetermined event(s), it may include a change of country in which the phone 12 is located and/or a change of cell associated with a base station which the phone 12 is attached.

In a preferred embodiment, such a service profile modification or creation application is written in Java, or termed applet.

The token OS includes a Run time Environment (or RE) that executes the interpreted executable data.

As will be explained in relation with FIG. 3, when the RE executes the service profile template executable data, the token OS creates or modifies a memory area that is associated with a service profile by using the service profile template. Thus, the memory area relating to the service profile is defined, i.e. created or modified, dynamically, i.e. in progress of execution of the service profile template executable data.

The mobile radio-communication network(s) 16 is(are) connected, through a bi-directional wired link 17, to the server 18, as Over-The-Air (or OTA) platform and back-end server.

Instead of a wired link 17, the server 18 may be connected, through a bi-directional wireless link, to the mobile radio-communication network(s) 16.

Alternatively, instead of a mobile radio-communication network(s), the server 18 is connected, Over-The-Internet (or OTI), to the phone 12, as token host device.

The server 18 is identified by a URI, like an URL, or an IP address, as server identifier. The server identifier is preferably stored within the token memory 144 and possibly a phone memory.

The server 18 may be operated by a mobile radio-communication network operator, as Mobile Network Operator (or MNO) or Mobile Virtual Network Operator (or MVNO), a service provider or on its behalf.

The server 18 is hosted by a computer.

The server 18 is dedicated to running an application for triggering a service profile creation or modification that occurs within a device that supports a service profile template that incorporates responsive executable data.

The server 18 may be further dedicated to running an application for managing a database and communicating some information of the database to outside, namely data relating to the diversified part of the service profile.

Alternately, another server (not represented) that is connected to the server 18 manages the database.

The server 18 includes preferably a memory 182 that stores the database.

Instead of an internal memory, the server 18 is connected to an external memory (not represented) storing the database.

The database includes a list of one or several sets of service profile data.

In a preferred embodiment, a service profile is a profile relating to a service subscription, like a profile relating to a subscription for accessing one or several mobile radio-communication networks, as wireless networks. Such a service subscription profile implies that, after the auto-installation of the service subscription profile, the server 18 downloads data relating to a diversified part of the service subscription profile, so as to complete the partly installed service subscription profile.

Such a server operation allows avoiding to reserve data stored at the token 14 side while keeping it, when required, at the server 18 side.

The service subscription profile data may include different kinds of data, like:

an International Mobile Subscriber Identity (or IMSI), as subscriber and service subscription identifier for accessing a mobile radio-communication network(s);

a key Ki, as network authentication key, and possibly data for authenticating to the server 18 or another remote server, allowing to authenticate the concerned subscriber to the mobile radio-communication network 16 or another mobile radio-communication network(s);

one or several authentication algorithms, like Milenage, allowing to authenticate the concerned subscriber to the mobile radio-communication network(s);

one or several passwords, like a PIN, and/or one or several cryptographic algorithm(s), as data relating to secret(s);

one or several security keys, like a key(s) for encrypting/decrypting data and/or a key(s) for signing data a key(s), one or several applicative keys, as key(s) for accessing one or several services, like a key for accessing a user bank account through the mobile radio-communication network(s) and/or a key for accessing a user bank account over a short range RF link (not represented); and/or one or several credentials, like a user name and/or IDentifier (or ID) of the subscriber, as data relating to the user.

Naturally, the service subscription profile data list that is herein above specified is not exhaustive and may comprise other configuration item(s) that is(are) not listed.

The server 18 is preferably able to encrypt/decrypt data to be exchanged with the token 14, as interlocutor device, by using an encryption/decryption key(s) shared with the token 14.

The server 18 is configured to send to a fleet of external device(s) one or several messages including a request for creating or modifying one or several service profiles based upon a service profile template.

The server 18 may be further configured to:

receive from an addressed external device one or several messages including a request for loading to the device data relating to one or several service profiles; and/or send to the addressed device one or several messages including data relating to one or several service profiles.

Figure 2:
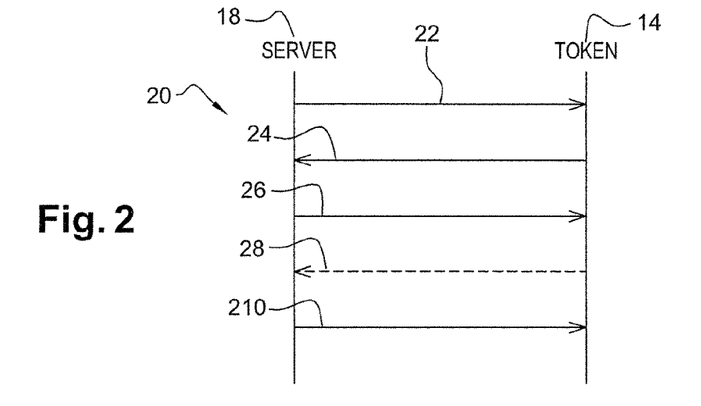
FIG. 2 represents an example of one message flow between the token, the host terminal and the remote server of FIG. 1, so that the server triggers a launching of the on-board service profile generation and further provides the token with diversified data.

FIG. 2 depicts an exemplary embodiment of a message flow 20 that involves the phone 12, the token 14 and the server 18, so as to install, on the token 14, a complete service subscription profile by using a pre-loaded template of a pre-defined service subscription profile.

In the explained example, it is assumed that the token 14 is coupled to the phone 12 and exchanges data, through the phone 12 (not represented), over an Short Message Service (or SMS) type channel, with the server 18. However, instead of the SMS type channel, any other kind of communication channel may be used to exchange data between the token 14 and the server 18.

It is also assumed that the token 14 supports a bootstrap service subscription profile, as first service profile, and a service subscription profile template, as service profile template. The token 14 stores the first service profile, so as to access OTA the server 18.

Optionally, the token 14 authenticates successfully the token user. To authenticate the token user, she/he submits user reference data that is stored within the token memory 144 and deemed as referring to an authorized user.

Advantageously, the server 18 authenticates successfully the token 14 by using a first authentication key Ki 1 that is associated with a first subscriber IMSI1 that are both stored within the token memory 144.

The server 18 may have received a message (not represented) originating from either the phone 12 or the token 14 that requests a new service subscription profile after the scenario that follows. The phone display screen 122 displays a list of one or several applications offered from or through the phone 12. The phone user selects, through the phone 12 MMI, an application that needs another service subscription profile. The phone 12 then requests preferably the token 14 to access a new service subscription profile, as a second service profile. The token 14 may support the application, e.g. a Sim Tool Kit (or STK) menu, that needs the second service profile.

The server 18 sends to the token 14 a message 22 including a request for creating a second service profile based upon a service profile template.

Alternately, instead of a service profile creation request, the server 18 sends to the token 14 a message including a request for modifying an existing service profile based upon a service profile template while identifying the concerned service profile, i.e. accompanying the request with a service profile identifier, that the token 14 already supports. The service profile identifier may be an Application IDentifier (or AID).

According to a preferred embodiment, the message 22 is a Short Message Service-Point to Point (or SMS-PP) type message, as defined in 3GPP Technical Specifications (or TS) 23.040, that includes a script being preferably encrypted. As known per se, a coding that is included in the SMS-PP type message requests the phone 12, as host device, to pack the entire message into an envelope command and to transfer it, through the envelope command, to the token 14, as addressed device. The encryption may be compliant with S Once the token 14 receives the message 22, the token 14 (and more exactly the token OS) interprets, after preferably a script decryption carried out by the token 14, and executes the script.

According to a preferred embodiment, the script is a Remote File Management (or RFM) type command that is conveyed, in an encrypted manner, within a Remote Application Management (or RAM) type mechanism that is compliant with ETSI TS 102.226. The RFM type command may be "STORE DATA RFM" wherein the RFM is encrypted within a Secure Channel Protocol (or SCP) 03 of the Global Platform (or GP) standard. The script includes executable data that is composed according to a Tag Length Value (or TLV) structure. The TLV structure may include a first TLV, a second TLV and a third TLV. The token 14 (and more exactly the token 14 OS) knows, thanks to the first TLV, that it relates to an RFM type mechanism that is launched. The second TLV may include "SELECT EF IMSI", by which the Elementary File (or EF) IMSI data is thus selected. The third TLV may include "UPDATE binary MNO", by which the MNO data is thus binary updated.

The script allows, when executed, pointing the service profile template "MNO".

The token 14 (and more exactly the token OS) interprets and executes the executable data comprised within the targeted service profile template.

While executing the service profile template executable data, the token 14 creates a memory area associated with the second service profile by using the service profile template.

Such a creation of the memory area allocated to the second service profile is automatic and does not need to involve the token user.

Optionally, the token 14 signs data to be sent by using a predetermined signature key stored within the token memory 144.

Optionally, the token 14 encrypts data to be sent by using either a public key relating to the server 18 or a shared key stored within the token memory 144 and the server memory 182.

Figure 3:
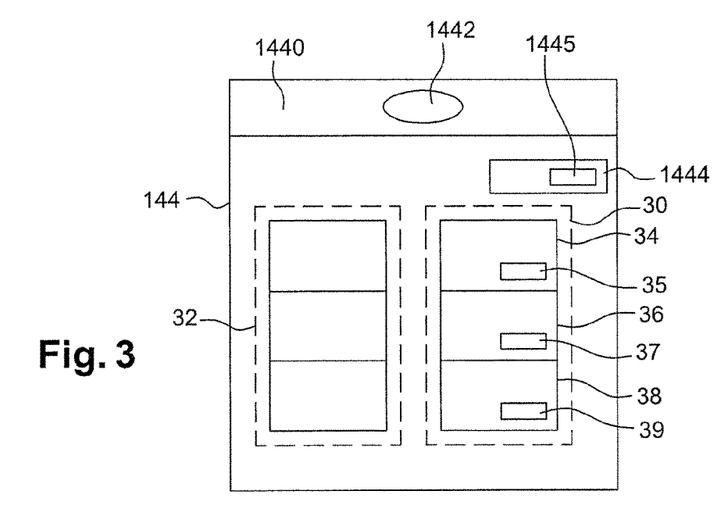
FIG. 3 shows an example of a token memory area which the token instantiates to, so as to create a new service profile that is completed by the diversified data that is loaded from the remote server further to the exchanged messages of FIG. 2.

Once the memory area within the token memory 144 has been created as further detailed in relation with FIG. 3, the token 14 (and more exactly the token OS) sends to the server 18 a message 24 including a request for loading into the token 14 (memory) data relating to the second service profile while identifying preferably the concerned second service profile, i.e. accompanying the request with an identifier relating to the second service profile (in the process of being generated).

Optionally, the server 18 decrypts the received encrypted data by using either a private key relating to the server 18 or a shared key stored within the token memory 144 and the server memory 182.

Optionally, the server 18 verifies the signature originating from the token 14 by using a predetermined signature verification key stored within the server memory 182.

Once the server 18 receives the second service profile data loading request, the server 18 identifies and fetches corresponding available service profile data to be allocated as second service profile data.

Optionally, the server 18 signs data to be sent by using a predetermined signature key stored within the server memory 182, so that the server 18 interlocutor is able to know the genuine sender of the thus sent data.

Optionally, the server 18 encrypts data to be sent by using either a public key relating to the token 14 or a shared key stored within the server memory 182 and the token memory 144. Such an encryption allows communicating data in a protected and secure manner.

Then, the server 18 sends to the token 14 one or several messages 26 including, as request response, data relating to the second service profile and that is preferably encrypted.

According to a preferred embodiment, the message(s) 26 is(are) a Short Message Service-Point to Point (or SMS-PP) type message, as defined in 3GPP Technical Specifications (or TS) 23.040, that includes a script. As known per se, a coding that is included in the SMS-PP type message requests the phone 12, as host device, to pack the entire message into an envelope command and to transfer it, through the envelope command, to the token 14, as addressed device.

Thus, preferably after a data decryption carried out by the token 14, the token 14 is able to complete the already installed second profile data with the sent data relating to a diversified part of the second service profile.

The loaded data relating to a diversified part of the second service profile, may include data for authenticating to the server 18, another remote or local device (not represented), e.g. credentials, like a subscriber identifier and an associated key Ki.

Since only few data relating to the second service profile has to be transmitted to complete the second service profile, only few SMS type messages are needed to transport such few data.

For instance, instead of downloading data with a size of typically 100 Kb for a full second service profile, only a size of up to 20 Kb relating to the diversified part of the second service profile is needed. Typically, only a number of up to 20 SMS is needed for downloading the complementary second service profile data.

There is thus no requirement for an HyperText Transfer Protocol (or HTTP)/IP channel to transport the complementary data relating to the second service profile optimizing thus the data traffic with respect to a transport of a full service profile.

Once provisioned by the server 18, the token 14 stores within the created memory area the data relating to the second service profile.

Alternately, instead of a service profile creation, when the token 14 modifies an existing service profile, the token 14 stores, within the modified memory area allocated to the existing service profile, the data relating to the second service profile.

All the second service profile data, relating to either a created service profile or a modified service profile, is now available at the token 14.

Optionally, the token 14 sends to the server 18 a message 28 including an acknowledgement of a receipt of the data relating to the second service profile. Thus, the token 14 indicates a completion of the second service profile installation.

Finally, the server 18 sends to the token 14 a message 210 including a request for switching from the first service profile to the second service profile while identifying at least the second service profile, i.e. accompanying the request with an identifier of the service profile to be activated.

The token 18 de-activates the first service profile, as the currently active service profile, and then activates the second service profile.

Once the token 14 has activated the second service profile, the token 14 may send to the server 18 a message (not represented) including information about such a second service profile activation.

The server 18 may further send to the token 14 a message including a command (not represented) for erasing data relating to the first service profile that is stored within the token memory 144. Once the token 14 has erased the first service profile, the token 14 may send to the server 18 a message (not represented) including information about such a first service profile erasure. The server 18 may then re-use the first service profile, at least for its diversified part since it is available. To re-use the first service profile, the server 18 may allocate it subsequently to the same token 14, another token or another device that requests an available service profile.

Alternately, instead of a message with a request for de-activating an active service profile, the server 18 sends to the token 14 a message including a request for activating the second service profile. Thus, once the second service profile is activated, a plurality of service subscription profiles may be active at a given time.

The token 14 may force, at its own initiative, the phone 12 to read from the token 14 the lastly installed and activated second service profile data.

FIG. 3 shows an architecture of the token memory 144 that is managed by the token OS 1440.

The token OS 1440 includes a VM-Run time Environment (or VM-RE) 1442 in which the VM interprets while the RE executes.

The token memory 144 stores the service profile template in a first memory area 1444. The first memory area 1444 includes a second memory area 1445 in which the executable data is stored.

The executable data may include a plurality of sets of TLV commands, like a first set of TLV commands, a second set of TLV commands and a third set of TLV commands.

The token OS 1440 allocates dynamically a third memory area 30 to the second service profile, when the service profile template is instantiated.

The allocated third memory area 30 may be a container. According to a preferred embodiment, the container is implemented as a Secure Domain (or SD) compliant with the GP standard.

The token OS 1440 allocates dynamically a fourth memory area 32 to the first service profile. According to a preferred embodiment, the fourth memory area 32 has, like the third memory area 30 as described infra, three memory areas.

The token 14 (and more exactly its OS 1440) instantiates the service profile template to the third memory area 30 allocated to the service profile template.

The allocated third memory area 30 stores non-executable data within a fifth memory area 36. The non-executable area is arranged according to a data structure that is defined by the executable data of the service profile template.

The data structure, as File System (or FS), may be compliant with ETSI TS 102.221, in which a Master File (or MF), as root file of a tree, is linked to one or several other files, like a Data File(s) (or DF), an Application Dedicated File(s) (or ADF) and/or EF(s).

The loaded data relating to the second service profile, e.g. credentials, like IMSI/Ki, may be stored within a seventh memory area 37.

The allocated third memory area 30 includes an eighth memory area 38. The eighth memory area 38 is allocated to an instantiation of an application that is interoperable, i.e. an application that is independent of the token OS 1440, like a STK menu.

The loaded data relating to the second service profile, e.g. application executable data, like data relating to a banking application, may be stored within a ninth memory area 39 that is allocated to an instantiation of a token OS independent application.

The allocated third memory area 30 includes a tenth memory area 34. The tenth memory area 34 is allocated to an instantiation of an application that is not interoperable, i.e. an application that is dependent on the token OS 1440, like a Network Authentication Application (or NAA). The executable data relating to such a token OS dependent application is stored within the token OS 1440.

The loaded data relating to the second service profile, e.g. application data, like data relating to a SIM type application, may be stored within an eleventh memory area 35 that is allocated to an instantiation of a token OS dependent application.

The first set of TLV commands may include TLV11 "INIT UPDATE", TLV12 "EXTERNAL AUTHENTICATE" and TLV13 "INSTALL UICC". The first set of TLV commands allows instantiating an FS.

The second set of TLV commands may include TLV21 "INIT UPDATE", TLV22 "EXTERNAL AUTHENTICATE" and TLV23 "LOAD application 1". The second set of TLV commands allows instantiating a token OS independent application.

The third set of TLV commands may include TLV31 "SELECT MF", TLV32 "CREATE 7F20", TLV33 "SELECT 7F20", TLV34 "CREATE EF IMSI", TLV35 "SELECT MF", TLV36 "CREATE 7F10", TLV37 "SELECT 7F10" and TLV38 "CREATE EF phonebook". The third set of TLV commands allows instantiating a token OS dependent application.

The invention solution allows adding a service profile while loading only few data and without needing to involve a person of a mobile operator.

The invention solution may be secure while exchanging data, in a confidential manner, between the server 18 and the token 14.

The embodiment that has just been described is not intended to limit the scope of the concerned invention. Other embodiments may be given. As another embodiment example, instead of exchanging with a remote server, the token 14 exchanges, over a contact-less radio-frequency link, with a local entity, like a local server.

The invention claimed is:

1. A method for accessing a service via a device comprising a memory,
   wherein the memory stores data relating to at least one service subscription profile template, the at least one service subscription profile template including executable data, the method comprises the following steps:
   sending, by a server, to the device a message including a request for creating or modifying at least one service subscription profile based upon a service subscription profile template;
   creating or modifying, by the device, a memory area while executing the executable data, the memory area being associated with a service subscription profile, as a partial on-board generated service subscription profile, by using the service subscription profile template;
   sending, by the server, to the device at least one message including complementary data relating to the service subscription profile; and
   storing, by the device, within the created or modified memory area the complementary data relating to the service subscription profile to complete the on-board generated service subscription profile.

2. The method according to claim 1, wherein the message including the request for creating or modifying at least one service subscription profile based upon the service subscription profile template further includes at least one service subscription profile identifier.

3. The method according to claim 1, wherein the device instantiates the service subscription profile template to a memory area allocated to the service subscription profile template.

4. The method according to claim 3, wherein the allocated memory area stores non-executable data, the non-executable data being arranged according to a data structure that is defined by an execution of the executable data.

5. The method according to claim 1, wherein the memory further stores at least one first service profile and the completed on-board generated service subscription profile as a second service subscription profile, and the method further comprises sending, by the server, to the device at least one message including a request for switching from the first service subscription profile to the second service subscription profile.

6. The method according to claim 5, further comprising deactivating, by the device, the first service subscription profile and activating the second service subscription profile.

7. The method according to claim 1, wherein the device includes loaded data relating to at least one service subscription profile for authenticating to the server or another device.

8. The method according to claim 1, wherein
   the device includes a token, the token being connected or coupled to a terminal, and
   the token exchanges data with the server, through the terminal, over a Short Message Service type channel.

9. A device for accessing a service, the device comprising a memory, wherein the memory stores data relating to at least one service subscription profile template, the at least one service subscription profile template including executable data, and wherein the device is adapted to:

receive from a server a message including a request for creating or modifying at least one service subscription profile based upon a service subscription profile template;

create or modify a memory area while executing the executable data, the memory area being associated with a service subscription profile, as a partial on-board generated service subscription profile, by using the service subscription profile template;

receive from the server at least one message including complementary data relating to the service subscription profile; and store within the created or modified memory area the complementary data relating to the service subscription profile to complete the on-board generated service subscription profile.

10. A system for accessing a service, the system comprising a server and a device, the device being connected or coupled to the server, the device comprising a memory, wherein the memory stores data relating to at least one service subscription profile template, the at least one service subscription profile template including executable data, the server is adapted to send to the device a message including a request for creating or modifying at least one service subscription profile based upon a service subscription profile template;

wherein the device is adapted to:

create or modify a memory area while executing the executable data, the memory area being associated with a service subscription profile, as a partial on-board generated service subscription profile, by using the service subscription profile template;

wherein the server is adapted to send to the device at least one message including complementary data relating to the service subscription profile; and wherein the device is adapted to store within the created or modified memory area the complementary data relating to the service subscription profile to complete the on-board generated service subscription profile.

* * * * *